United States Patent
Yamakoshi et al.

(10) Patent No.: US 10,939,515 B2
(45) Date of Patent: Mar. 2, 2021

(54) DISCHARGE LAMP AND DISCHARGE LAMP APPARATUS

(71) Applicant: PHOTOSCIENCE JAPAN CORPORATION, Tokyo (JP)

(72) Inventors: Yuji Yamakoshi, Taito-ku (JP); Mitsuhiro Matsuda, Yokohama (JP)

(73) Assignee: PHOTOSCIENCE JAPAN CORPORATION, Tokyo (JP)

(*) Notice: Subject to any disclaimer, the term of this patent is extended or adjusted under 35 U.S.C. 154(b) by 0 days.

(21) Appl. No.: 16/636,733

(22) PCT Filed: Jun. 4, 2018

(86) PCT No.: PCT/JP2018/021343
§ 371 (c)(1),
(2) Date: Feb. 5, 2020

(87) PCT Pub. No.: WO2019/039031
PCT Pub. Date: Feb. 28, 2019

(65) Prior Publication Data
US 2020/0236752 A1      Jul. 23, 2020

(30) Foreign Application Priority Data

Aug. 22, 2017  (JP) .............................. JP2017-159188

(51) Int. Cl.
*H05B 41/36* (2006.01)
*H05B 41/24* (2006.01)
(Continued)

(52) U.S. Cl.
CPC ............. *H05B 41/36* (2013.01); *H05B 41/24* (2013.01)

(58) Field of Classification Search
None
See application file for complete search history.

(56) References Cited

U.S. PATENT DOCUMENTS

| 5,977,692 A | 11/1999 | Itaya |
| 2017/0045214 A1 | 2/2017 | Johnson |

(Continued)

FOREIGN PATENT DOCUMENTS

| JP | S63116353 A | 5/1988 |
| JP | H10321192 A | 12/1998 |

(Continued)

OTHER PUBLICATIONS

International Search Report issued in Intl. Appln. No. PCT/JP2018/021343 dated Aug. 28, 2018. English translation provided.
(Continued)

*Primary Examiner* — Dedei K Hammond
(74) *Attorney, Agent, or Firm* — Rossi, Kimms & McDowell LLP

(57) ABSTRACT

A discharge lamp includes a discharge tube containing electrodes, and base sections. The base sections have terminals for connecting to external power lines, and internal power lines for connecting the terminals to the electrodes within the discharge tube. Information generation devices that generates information to be output to outside are provided within the base sections. Superimposition circuits that superpose the information, generated by the information generation devices, on the internal power lines within the base sections are also provided within the base sections. The information generation devices include sensors and generate information based on output of the sensors. A receiving circuit extracts and receives the information, superposed on the internal power lines, from the external power lines connected to the internal power lines. Thus, information generated on the discharge lamp side can be transmitted to outside with a simple construction.

14 Claims, 3 Drawing Sheets

(51) Int. Cl.
  *H01J 5/50* (2006.01)
  *H01J 61/56* (2006.01)

(56) References Cited

U.S. PATENT DOCUMENTS

| 2017/0164439 A1* | 6/2017 | Reed .................... F21V 9/20 |
| 2017/0227941 A1* | 8/2017 | Chosokabe ............ H05B 47/19 |

FOREIGN PATENT DOCUMENTS

| JP | H10334792 A | 12/1998 |
| JP | 2001307505 A | 11/2001 |
| JP | 2008166071 A | 7/2008 |
| JP | 2009021056 A | 1/2009 |
| JP | 2011204637 A | 10/2011 |
| JP | 2012186130 A | 9/2012 |
| JP | 2013222566 A | 10/2013 |
| JP | 2015011937 A | 1/2015 |
| JP | 2016184514 A | 10/2016 |
| JP | 2017037796 A | 2/2017 |
| JP | 2017037812 A | 2/2017 |
| JP | 2017143444 A | 8/2017 |

OTHER PUBLICATIONS

Written Opinion issued in Intl. Appln. No. PCT/JP2018/021343 dated Aug. 28, 2018.
English translation of Written Opinion issued in Intl. Appln. No. PCT/JP2018/021343 dated Aug. 28, 2018, previously cited in IDS filed Feb. 5, 2020.
International Preliminary Report on Patentability issued in Intl. Appln. No. PCT/JP2018/021343 dated Mar. 5, 2020. English translation provided.

* cited by examiner

DISCHARGE LAMP AND DISCHARGE LAMP APPARATUS

TECHNICAL FIELD

The present invention relates generally to a discharge lamp, such as an illuminating discharge lamp or a sterilizing or microorganism-decomposing discharge lamp (such as an ultraviolet lamp), and more particularly to a discharge lamp having an information transmission function for transmitting information to outside.

BACKGROUND ART

In many discharge lamp apparatus used for underwater illumination, water treatment plants, or the like, a discharge lamp is accommodated in a non-water-side section, provided with a water-blocking partition wall, to irradiate output light from the discharge lamp into water. In such a case, when the discharge lamp is activated (turned on or lit) and then turned off, dew condensation often occurs on the partition wall due to a temperature difference between the non-water side and the water side. Further, water often leaks into the non-water-side section due to wear or deterioration of a sealed portion of the partition wall. Further, even if the dew or leaked-in water dries out, impurities would adhere to a dried creepage surface, which can result in lowering of insulating resistance of the creepage surface between the discharge lamp and non-water-side environment. In any case, if a charging section of the discharge lamp is immersed in water and then the water dries out, for example, there would arise the problems that the discharge-lamp charging section, requiring application of a high voltage at the time of start of lighting, sparks to be damaged and a ballast supplying electric power to the discharge lamp is damaged. As a measure to prevent such problems, it may be possible or conceivable to provide, for example, a commercially available water leakage sensor and a commercially available electrical leakage sensor near the discharge-lamp charging section.

Further, if an emitter (electron emitting substance) coated on a filament exhausts as a symptom at the end of life of the lamp, the lamp burns out after the filament becomes extremely hot. In order to detect in advance such a symptom occurring at the end of life of the lamp, it may be possible or conceivable to monitor an ambient temperature of the filament. Furthermore, if water or moisture enters base sections provided at the opposite ends of the lamp, the lamp can burn out by electric lines electrically short-circuiting with one another. In order to detect in advance such a lamp burnout caused by moisture, it is conceivable to monitor moisture within the base sections.

With regard to the aforementioned phenomena, there have heretofore been known various descriptions about providing a sensor or the like within a base section of a discharge lamp. For example, patent literature 1 identified below discloses that a temperature protecting device (fuse) is connected in series with a power line. Likewise, patent literatures 2 and 3 disclose that a small-size protecting device, such as a fuse, is provided within a base section of a lamp. Further, patent literature 4 discloses that a sensor is built in a globe of an LED lamp. Although these patent literatures disclose that a signal generated or detected within the lamp is used within the lamp, they do not disclose transmitting such a signal to outside. In a case where a signal generated or detected within the lamp is to be transmitted to outside, it is conceivable to provide a transmission device composed of wired means for transmitting the signal to outside. In such a case, however, additional wires for feeding power to the sensors and output lines for transmitting detection results to outside have to be provided in addition to originals lines of the lamp, which would complicate a construction of the base section of the lamp and a construction of a socket for receiving the base section. Further, in order to provide such additional lines, it may become necessary to do civil engineering work for changing wiring and/or piping or replace existing facilities in underwater illumination or water treatment plant, or the like, because a sectional area of a previous wiring path is insufficient.

Nowadays, it has also been proposed to effect communication between a lamp and outside in a non-contact manner. For example, patent literature 5 identified below discloses that a wireless communication unit and a membrane functioning as a substitute for a speaker are provided within a lamp such that a sound signal received from outside via the wireless communication unit is sounded or audibly generated by the speaker-substituting membrane. Further, patent literature 6 discloses that a beacon module that receives external power via a base section and operates in a manner capable of bidirectional, wireless communication is provided within an LED lamp, and that position information and beacon ID information is transmitted to outside through the bidirectional, wireless communication. However, in the case where such wireless communication means is used, wireless communication equipment has to be provided within the lamp, which would result in a complicated construction.

Patent Literature 1: Japanese Patent Application Laid-open Publication No. HEI 10-334792

Patent Literature 2: Japanese Patent Application Laid-open Publication No. 2015-11937

Patent Literature 3: Japanese Patent Application Laid-open Publication No. 2017-37796

Patent Literature 4: Japanese Patent Application Laid-open Publication No. 2011-204637

Patent Literature 5: Japanese Patent Application Laid-open Publication No. 2013-222566

Patent Literature 6: Japanese Patent Application Laid-open Publication No. 2017-37812

SUMMARY OF INVENTION

In view of the foregoing prior art problems, it is one of the objects of the present invention to provide a discharge lamp and a discharge lamp apparatus which, with a simple construction, enable information generated in the lamp to be transmitted to outside.

A discharge lamp according to the present invention includes: a discharge tube; a base section connected to the discharge tube and including a terminal for connecting to an external power line and an internal power line that connects the terminal to an electrode within the discharge tube; an information generation device that is provided within the base section and generates information to be output to outside; and a superimposition circuit that is disposed within the base section and superimposes the information, generated by the information generation device, on the internal power line within the base section.

The discharge lamp according to the present invention is constructed in such a manner that information generated by the information generation device is superimposed by the superimposition circuit on the internal power line. Thus, when the discharge lamp is connected to an external power supply, the information superimposed on the internal power line is output onto the external power line connected to the internal power line via the terminal of the base section. In this way, information generated on the discharge lamp side can be transmitted to outside with a simple construction where only the superimposition circuit, including a mixing resistor and the like, is provided within the base section, without a complicated device, such as wireless communication equipment, having to being provided within the base section.

DESCRIPTION OF EMBODIMENTS

Figure 1:
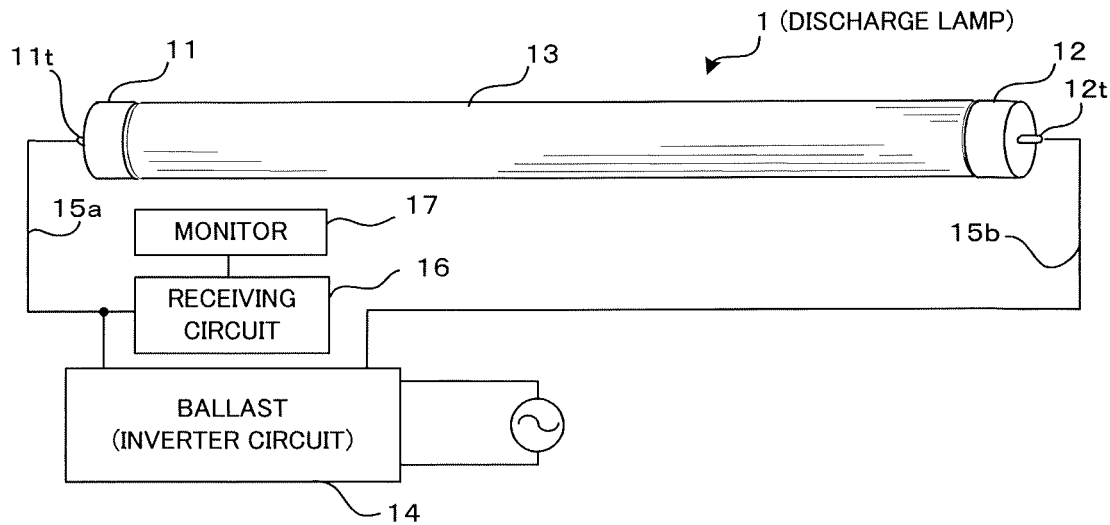
FIG. 1 is a schematic block diagram showing an embodiment of a discharge lamp apparatus provided with a discharge lamp according to the present invention.

FIG. 1 shows an example where a discharge lamp apparatus according to an embodiment of the present invention is provided with a straight-type discharge lamp 1 having lamp base sections (end cap sections) 11 and 12 at its opposite ends. The discharge lamp 1 is, for example, of a cold cathode type, which is lit at a high frequency by a power signal of about several hundred bolts and about 50 kHz supplied from a ballast (inverter circuit) 14. As known, the base sections 11 and 12 are connected to opposite ends of a discharge tube 13 (glass tube of the discharge lamp 1) and have respective power supplying terminals 11$t$ and 12$t$. The terminals 11$t$ and 12$t$ are connected to respective electrodes within the discharge tube 13 via power lines (internal power lines) provided within the base sections 11 and 12. The terminals 11$t$ and 12$t$ projecting from the base sections 11 and 12 are connected to external power output lines (external power lines) 15$a$ and 15$b$ of the ballast (inverter circuit) 14 when the terminals 11$t$ and 12$t$ are attached to discharge-lamp-attaching sockets (not shown). Note that the discharge lamp 1 may be an ultraviolet lamp that irradiates ultraviolet rays suited for water treatment, sterilizing treatment, microorganism-decomposing treatment, and the like or may be an illuminating lamp without being limited to such an ultraviolet lamp.

Figure 2:
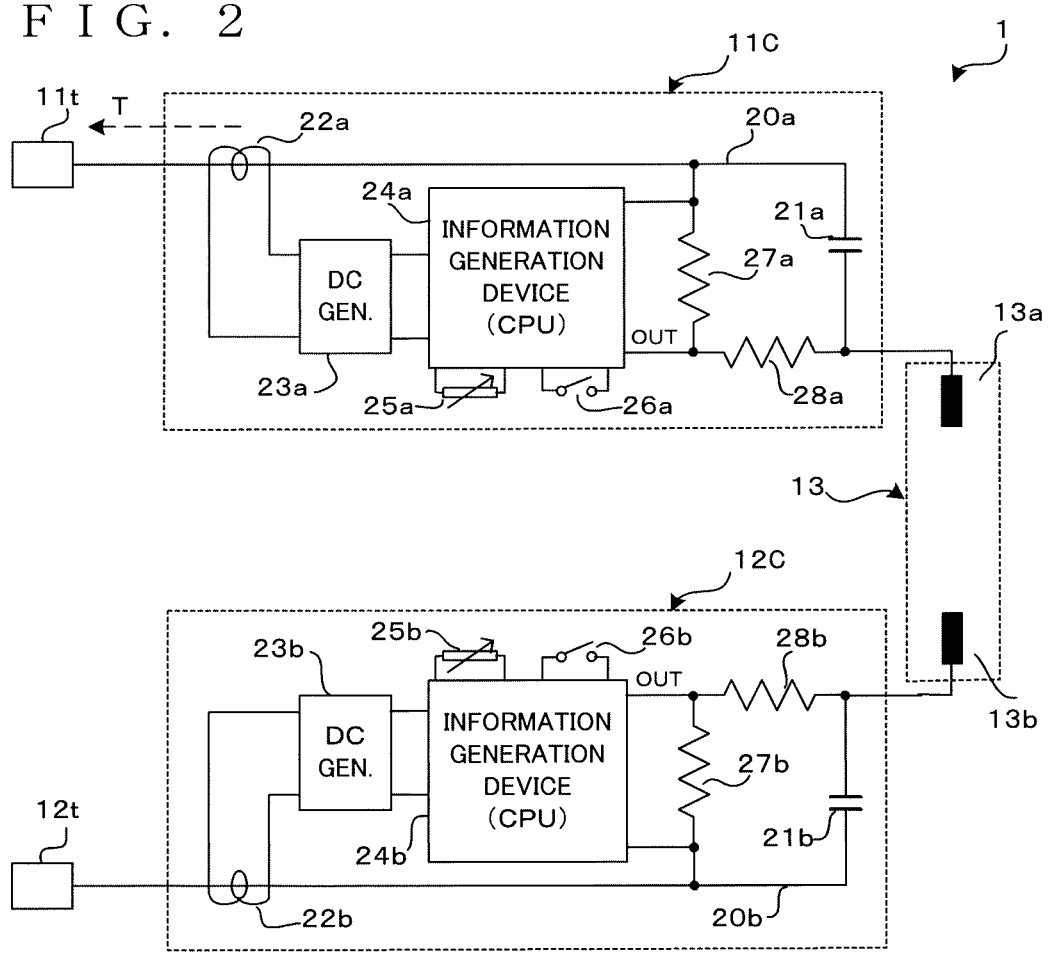
FIG. 2 is a schematic circuit diagram showing the discharge lamp according to an embodiment of the present invention.

FIG. 2 is schematic circuit diagram of the discharge lamp 1 according to an embodiment of the present invention, which particularly illustrates constructions of circuits 11C and 12C provided respectively within the base sections 11 and 12. Describing the circuit 11C provided within one of the base section 11, a DC-component-blocking capacitor 21$a$ is inserted in a portion, near the electrode 13$a$ within the discharge tube 13, of the internal power line 20$a$ that interconnects the power supplying terminal 11$t$ and the electrode 13$a$. A current transformer 22$a$ is wound around the internal power line 20$a$ such that an AC signal for generating DC power is taken out from a high-frequency power signal, flowing in the internal power line 20$a$, in a non-contact manner. A DC voltage generation circuit 23$a$, which converts the AC signal, taken out from the current transformer 22$a$, into a predetermined DC voltage, is composed, for example, of a full-wave rectifying diode circuit, a smoothing capacitor, a constant-voltage-generating Zener diode, and the like. The DC power supply voltage generated by the DC voltage generation circuit 23$a$ is supplied to an information generation device 24$a$.

The information generation device 24$a$ is composed of a CPU (microprocessor) and the like and functions to generate information to be output from the discharge lamp 1 to outside. As an example, one or more sensors 25$a$ and 26$a$ for detecting environment within or around the base section 11 are incorporated in the information generation device 24$a$, and the information generation device 24$a$ is configured to generate the information in response to detection signals of the sensors 25$a$ and 26$a$. For example, the sensor 25$a$ is a temperature sensor for detecting a temperature of the electrode 13$a$. Once the temperature detected by the sensor 25$a$ reaches a predetermined threshold value, the information generation device 24$a$ generates information indicating that an abnormality has occurred in the electrode 13$a$ of the discharge lamp 1 and outputs the generated information via an output end OUT. The sensor 26$a$ is a sensor for detecting presence/absence of dew condensation within the base section 11. Once the sensor 26$a$ detects dew condensation, a particular switch provided in association with the sensor 26$a$ is turned on, in response to which the information generation device 24$a$ generates information indicating that the sensor 26$a$ has detected the dew condensation and outputs the generated information via the output end OUT. The information generation device 24$a$ may be designed to generate any other desired information to be output to outside, without being limited to the aforementioned examples.

The information generation device 24$a$ generates the information in serially encoded form. Namely, codes each composed of a plurality of bits are assigned to individual information to be output to outside, according to type of content of the information. Thus, one code composed of a plurality of bits corresponding to one piece of information to be output is output from the output end OUT in a serial binary data format. The data to be output from the output end OUT is expressed in a DC voltage corresponding to a logical value of "0" or "1". A receiving side that will be described later can identify, from the content of the serial code, meaning/content of the information transmitted from the discharge lamp 1. Needless to say, the data format of the information to be output from the output end OUT of the information generation device 24$a$ is not limited to the aforementioned serially encoded form and may be any other form as long as the meaning/content of the information can be identified from a power signal to be applied to the discharge tube 13 via the internal power line 20$a$, when the information is superimposed on the power signal; for example, the information to be output from the output end OUT may be in the form of a signal of a considerably lower frequency than the power signal to be applied to the discharge tube 13 or in the form of a signal expressed by progressive DC voltages.

The information (such as serially encoded binary data) output from the output end OUT of the information generation device 24$a$ is superimposed on (namely, added to) the power signal via a mixing resistor 27$a$. A point of addition by the mixing resistor 27$a$ on the internal power line 20$a$ is located before the DC-component-blocking capacitor 21$a$ (namely, between the power supplying terminal 11t and the DC-component-blocking capacitor 21a). In other words, the DC-component-blocking capacitor 21a is inserted between the point of addition by the mixing resistor 27a and the electrode 13a. Note that a bypassing resistor 28a is connected between the output end OUT of the information generation device 24a and the electrode 13a of the information generation device 24a in such a manner that a DC component can bypass the capacitor 21a. Stated differently, a series circuit of the mixing resistor 27a and the bypassing resistor 28a is provided so as to constitute a circuit parallel with the capacitor 21a. The mixing resistor 27a functions as a superimposition circuit that superimposes the information, generated by the information generation device 24a, on the internal power line 20a. The bypassing resistor 28a also serves to collectively superimpose information from the circuit 12C of the other base section 12, having appeared on the electrode 13a, on the same internal power line 20s as for the information from the circuit 11C of the one base section 11, details of which will be described later.

According to the above-described construction, once some information is generated from the information generation device 24a within the base section 11 during lighting of the lamp, the information (such as serially encoded binary data) is output from the output end OUT and superimposed via the mixing resistor 27a on a power signal on the internal power line 20a. In this manner, the information is transmitted (output) to outside via the power supplying terminal 11t, as depicted by broken-line arrow T in FIG. 2. Namely, when the power supplying terminal 11t is connected to the external power line 15a as shown in FIG. 1, the information (such as serially encoded binary data) superimposed on the internal power line 20a appears on the external power line 15a connected to the internal power line 20a via the terminal 11t of the base section 11. In this manner, the information is transmitted (output) to outside. As will be described later, a timing for outputting information from the information generation device 24a can be controlled as desired.

In the discharge lamp apparatus shown in FIG. 1, a receiving circuit 16 and a monitor device 17 are further provided. The receiving circuit 16 extracts and receives the information, superimposed on the internal power line 20a of the discharge lamp 1, from the external power line 15a connected to the internal power line 20a. The extraction of the superimposed information is performed by extracting a DC component (or predetermined low-frequency component) via an RC circuit, a low-pass filter circuit, or the like. The receiving circuit 16 completes the reception of the information by decoding the content of the information from the extracted DC component (or predetermined low-frequency component). The information received (decoded) by the receiving circuit 16 can be used as appropriate for controlling the discharge lamp 1. For example, the content of the information received (decoded) by the receiving circuit 16 is visibly presented by the monitor device 17. The receiving circuit 16 can perform various controls; for example, once the receiving circuit 16 detects dew condensation at start-up of lighting or an abnormal temperature during the lighting on the basis of information transmitted from the information generation device 24a, the receiving circuit 16 transmits a control signal to the ballast 14 so as to stop inverter output or power off or power down (or reduce power supply to) a lighting system to avoid an abnormality of the lighting system. Further, the monitor device 17 can be controlled to not only display a state, such as an inverter stop state or a lamp turned-off state, but also display a cause of such a state (such as dew condensation or leaked water, temperature abnormality, or the like).

Referring back to FIG. 2, the circuit 12C provided within the other lamp base section 12 is constructed in the same manner as the aforementioned circuit 11C, and a DC-component-blocking capacitor 21b is inserted between an internal power line 20b connected to the power supplying terminal 12t and the other electrode 13b within the discharge tube 13. Constructions and functions of a current transformer 22b, a DC voltage generation circuit 23b, an information generation device 24b, one or more sensors 25b and 26b, and resistors 27b and 28b within the circuit 12C are the same as the constructions and functions of the aforementioned corresponding circuits and devices 22a to 28a (of the same names) within the circuit 11C. Note, however, that the sensors 25b and 26b detect environment (temperature and humidity) within or around the base section 12 accommodating the sensors. Operation of the circuit 12C is similar to the operation of the circuit 11C. Namely, the circuit 12C superimposes information, generated by the information generation device 24b, on the internal power line 20b. The information thus superimposed on the internal power line 20b can be transmitted (output) via the corresponding terminal 12t to the external power line 15b (FIG. 1) connected to the terminal 12t.

If a receiving circuit (additional receiving circuit) similar to the receiving circuit 16 provided in association with the one external power line 15a is also provided in association with the other external power line 15b, the information, superimposed on the internal power line 20b, can be extracted and received by the additional receiving circuit from the external power line 15b connected to the internal power line 20b. In such a case, although the aforementioned monitor device 17 can be shared between the receiving circuit 16 and the additional receiving circuit, a dedicated monitor device may be provided for the additional receiving circuit.

However, in the discharge lamp apparatus shown in FIG. 1, the receiving circuit 16 (and monitor device 17) are provided in association with only the one external power line 15a so that the constructions of the receiving circuit 16 and monitor device 17 can be simplified. Thus, the resistors 28a and 28b are provided respectively in the circuits 11C and 12C, as shown in FIG. 2, in such a manner that information output from the information generation device 24b of the other circuit 12C is superimposed on the internal power line 20b via the resistor 28b and caused to appear on the internal power line 20a of the one circuit 11C via the discharge lamp 13, resistor 28a, and resistor 27a. Namely, when discharge is being performed between the electrodes 13a and 13b, impedance between the electrodes 13a and 13b of the discharge lamp 13 can be regarded as being of a fixed value. Thus, once information (such as serially encoded binary data) output from the information generation device 24b of the other circuit 12C is applied via the resistor 28b to the electrode 13b at one end of the internal power line 20b, a voltage drop of a DC component corresponding to the applied information appears as-is on the electrode 13a of the circuit 11C, so that the DC component is superimposed, from the electrode 13a, on the internal power line 20a via the resistors 28a and 28b. In this case, in the circuit 12C, the resistor 28b functions as a mixing resistor that superimposes information, output from the corresponding information generation device 24b, on the corresponding internal power line 20b, but also as a bypassing resistor for bypassing the corresponding DC-component-blocking capacitor 21b. In the circuit 11C, on the other hand, the resistor 28a functions as a bypassing resistor that causes a DC component, sent from the internal power line 20b of the other circuit 12C and appearing on the electrode 13a, to bypass the capacitor 21a.

In this manner, the information generated in the circuit 12C of the other base section 12 is superimposed on the internal power line 20a within the circuit 11C of the one base section 11 and transmitted (outputted) to the one external power line 15a via the terminal 11t as depicted by arrow T. Thus, with the circuit construction of FIG. 2, information generated within the circuits 11C and 12C of the two base sections 11 and 12 can be output via the shared internal power line 20a to the shared external power line 15a in a superimposed manner. In this way, by merely providing the receiving circuit 16 (and monitor device 17) in association with only the one external power line 15a, it is possible to extract and receive information generated within the circuits 11C and 12C of the two base sections 11 and 12. Note that, in this case, codes identifying the individual base sections 11 and 12 may be output added to state/environment detection information generated from the respective information generation devices 24a and 24b. In this way, it is possible to identify in which of the base sections 11 and 12 an abnormality has occurred. However, more simply, processes, such as a lamp stop process and a cause display process, may be performed once an abnormality has occurred in either one of the base sections, without particularly identifying in which of the base sections 11 and 12 the abnormality has occurred.

Note that in the case where the information generated by any one of the information generation devices 24a and 24b is detection information of a state, environment, and/or the like of the discharge lamp 1, the timing at which information generated by any one of the information generation devices 24a and 24b is to be output to the internal power line 20a or 20b may be any appropriate timing corresponding to a time point at which the content of the detection information has been updated (namely, a time point at which a change in the content of the information has been detected). Alternatively, various generated (or updated) information may be stored in a buffer, and the generated (or updated) information may be output periodically on the basis of the buffer storage. Let it be assumed here that, in this case, control is performed such that the timing for outputting various information generated by the individual information generation devices 24a and 24b is differentiated in order to prevent these information generated by the information generation devices 24a and 24b from being superimposed simultaneously on the same internal power line 20a. For example, arrangements may be made such that the information generated by the individual information generation devices 24a and 24b is output from the devices 24a and 24b periodically at mutually different timings with a time point of start of lamp lighting used as a trigger time point (namely, the information generated by the information generation devices 24a and 24b is output at predetermined timings following the lamp lighting start time).

As another alternative, arrangements may be such that an information transmission request is given at desired timings, which are controlled to not overlap each other, from the side of the receiving circuit 16 and monitor device 17 to the base sections 11 and 12 so that requested information is output, in response to the information transmission request, from the information generation devices 24a and 24b of the base sections 11 and 12 (namely, the information is output when an information transmission request has given from outside). However, in such a case, it is necessary to additionally provide a request generator for generating the information transmission request from the side of the receiving circuit 16 and monitor device 17 and additionally provide, in the circuit 11C, 12C of each of the base sections 11 and 12, a request receiver for receiving and decoding the given information transmission request. As another example, it may be possible or conceivable to use some ingenuity to require no such request generator and request receiver. As an example of such ingenuity, it is conceivable that when an information transmission request is to be given to the base sections 11 and 12, it is conceivable for the ballast (inverter circuit) 14 itself to instantly power off the external power lines 15a and 15b instead of the information transmission request being generated from the side of the receiving circuit 16 and monitor device 17. In such a case, the circuit 11C, 12C of each of the base sections 11 and 12 detects the instant power-off of the internal power line 20a or 20b and triggers, in response to the detection of the instant power-off, the information generation device 24a or 24b to transmit information. In response to such triggering, the information generation devices 24a and 24b output information, generated thereby, at respective different timings measured from a time point of the triggering (namely, the circuits 11C and 12C of the base sections 11 and 12 output the information in response to detection of the instant power-off of the external power lines 15a and 15b). In this way, it just suffices to add a simple, instant-power-off detection circuit, without requiring an extra request generator and request receiver.

Figure 3:
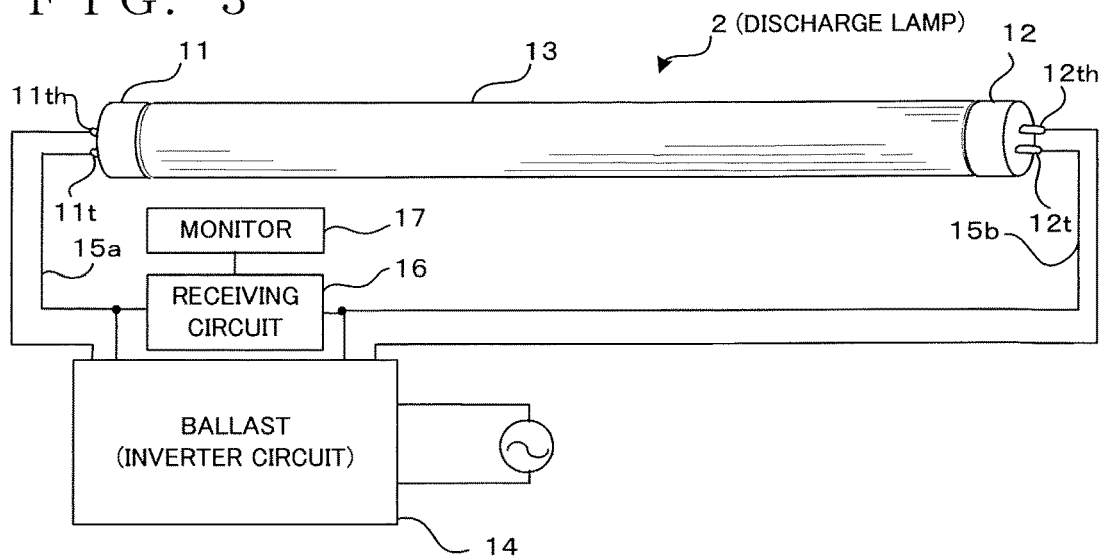
FIG. 3 is a schematic block diagram showing an embodiment of a discharge lamp apparatus provided with a discharge lamp according to another embodiment of the present invention.
Figure 4:
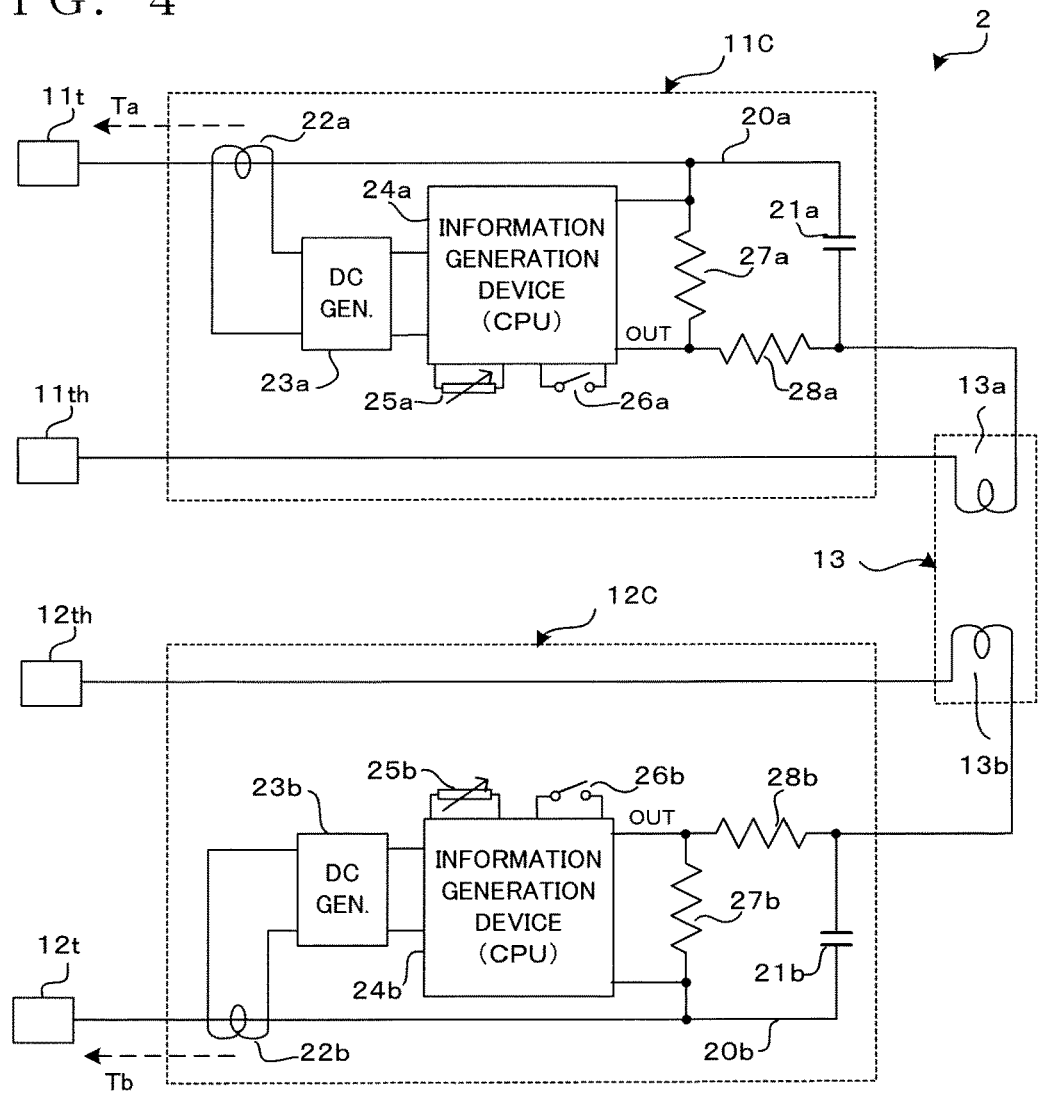
FIG. 4 is a schematic circuit diagram of the discharge lamp according to the other embodiment of the present invention shown in FIG. 3.

Although the foregoing has described the embodiment where the discharge lamp 1 to which the present invention is applied is a cold-cathode-type discharge lamp, the present invention is not so limited and can of course be applied to a hot-cathode-type discharge lamp as well. FIG. 3 is a schematic view illustrating an embodiment of a discharge lamp apparatus provided with a discharge lamp 2 in the form of a hot-cathode-type discharge lamp. FIG. 4 is a schematic circuit diagram of the discharge lamp 2 in the form of a hot-cathode-type discharge lamp shown in FIG. 3. In FIGS. 3 and 4, circuits, devices, and other components having the same functions as the circuits, devices, and other components shown in FIGS. 1 and 2 are denoted by the same reference characters as in FIGS. 1 and 2 and will not be described here to avoid unnecessary duplication. The embodiment shown in FIG. 4 differs from the embodiment shown in FIG. 2 in that a preheating terminal 11th, 12th is added to each of the base sections 11 and 12, but an inner construction of the circuit 11C, 12C provided within each of the base sections 11 and 12 is similar to that in FIG. 2 and operates in a manner similar to the above. As known, a ballast (inverter circuit) for a hot-cathode-type discharge lamp is employed as the ballast (inverter circuit) 14. A filament-preheating capacitor (not shown) is provided on the side of the ballast (inverter circuit) 14 between the preheating terminals 11th and 12th. Once a power signal is supplied via the power supplying terminals 11t and 12t, the filaments are preheated via the preheating terminals 11th and 12th and the preheating capacitor. Note that the electrodes 13a and 13b are the preheating filaments. In the illustrated example, information generated in the circuit 11C of the one base section 11 is superimposed on the internal power line 20a within the circuit 11C and transmitted (output) to the one external power line 15a via the terminal 11t as depicted by broken-line arrow Ta, while information generated in the circuit 12C of the other base section 12 is superimposed on the internal power line 20b within the circuit 12C and transmitted (output) to the other external power line 15b via the terminal 12t as depicted by broken-line arrow Tb. In this case, the receiving circuit 16 shown in FIG. 3 is configured to separately receive and decode the information output to the respective external power lines 15a and 15b in a superimposed manner.

Figure 5:
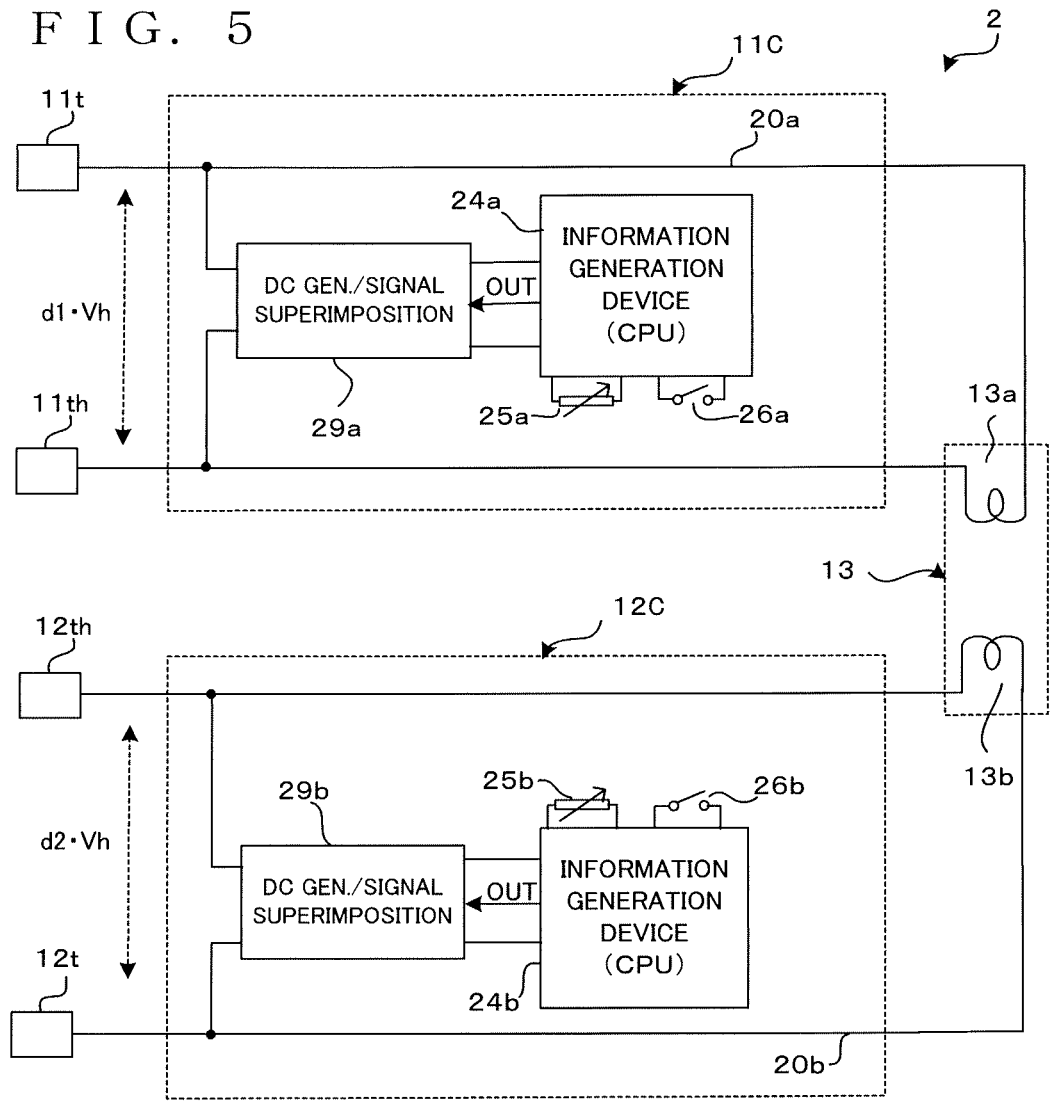
FIG. 5 is a schematic circuit diagram showing another example of a circuit construction of base sections provided in the discharge lamp in the form of a hot-cathode-type discharge lamp as shown in FIG. 3.

FIG. 5 is a schematic circuit diagram illustrating another embodiment of the circuit 11C, 12C of each of the base sections 11 and 12 in the discharge lamp 2 in the form of a hot-cathode-type discharge lamp shown in FIG. 3 (namely, a modification of FIG. 4). In FIG. 5, circuits, devices, and other components having the same functions as the circuits, devices, and other components shown in FIG. 4 are denoted by the same reference characters as in FIG. 4 and will not be described here to avoid unnecessary duplication. Although the embodiment of FIG. 5 is similar to the embodiment of FIG. 4 in that the preheating terminal 11th, 12th is added to each of the base sections 11 and 12 and in terms of the constructions of the information generation devices 24a and 24b and the sensors 25a and 26a, the embodiment of FIG. 5 differs from the embodiment of FIG. 4 in terms of other constructions. Describing now the circuit 11C corresponding to the base section 11, a DC generation/signal superimposition circuit 29a takes in an AC voltage between the terminals 11t and 11th (namely, between the internal power line 20a and a preheating line), converts the taken-in AC voltage into a DC voltage, and supplies DC power to the information generation device 24a. The DC generation/signal superimposition circuit 29a also causes amplitude modulation, based on a DC component d1 corresponding to information (serially encoded binary data) output from the output end OUT of the information generation device 24a, in the AC voltage between the terminals 11t and 11th (between the internal power line 20a and the preheating line) to thereby superimpose the information (serially encoded binary data), output from the output end OUT, on the internal power line 20a. Namely, the AC voltage between the terminals 11t and 11th (between the internal power line 20a and the preheating line) is amplitude-modulated by the DC component d1 corresponding to the information (serially encoded binary data) (d1·Vh). For example, the DC generation/signal superimposition circuit 29a includes a variable impedance device, such as a transistor, provided in parallel with a preheating circuit (preheating filament 13a), and the DC generation/signal superimposition circuit 29a can perform amplitude-modulation, corresponding to the DC component d1, of the heater AC voltage Vh by variably controlling the impedance device in accordance with the information (serially encoded binary data). Namely, the DC generation/signal superimposition circuit 29a can amplitude-modulate the AC voltage of the internal power line 20a in accordance with the information generated by the information generation device 24a.

The circuit 12C corresponding to the other base section 12 is constructed in a similar manner to the above-described circuit 11C. A DC generation/signal superimposition circuit 29b takes in an AC voltage between the terminals 12t and 12th (namely, between the internal power line 20b and a preheating line), converts the taken-in AC voltage into a DC voltage, and supplies DC power to the information generation device 24b. The DC generation/signal superimposition circuit 29b also causes amplitude modulation, based on a DC component d2 corresponding to information (serially encoded binary data) output from the output end OUT of the information generation device 24b, in the AC voltage Vh between the terminals 12t and 12th (between the internal power line 20b and the preheating line) to thereby superimpose the information, serially output from the output end OUT, on the internal power line 20b (d2·Vh).

Furthermore, in a case where the present invention is applied to a discharge lamp of a type including only one base section, it just suffices to provide only one circuit (11C, for example) corresponding to the one base section. In such a case, the bypassing resistor 28a shown in FIG. 2 or 4 can be omitted. Furthermore, the present invention is applicable to a discharge lamp of any other desired shape, such as an annular shape or a bulb shape, than the straight shape.

The invention claimed is:

1. A discharge lamp comprising:
   a discharge tube;
   a base connected to the discharge tube, the base including
     a terminal for connecting to an external power line and
     an internal power line that connects the terminal to an
     electrode within the discharge tube;
   an information generation device that is disposed within
     the base and generates information to be outputted
     external to the discharge lamp; and
   a superimposition circuit that is disposed within the base
     and superimposes the information, generated by the
     information generation device, on the internal power
     line within the base.

2. The discharge lamp according to claim 1, wherein the superimposition circuit superimposes the information on the internal power line as a signal of a lower frequency than a power signal that is to be applied to the discharge tube via the internal power line to the discharge tube, or as a DC signal.

3. The discharge lamp according to claim 1, wherein the information generation device generates the information in serially encoded form, and the information in the serially encoded form is superimposed on the internal power line.

4. The discharge lamp according to claim 1, wherein the superimposition circuit includes a mixing resistor for adding the information, generated by the information generation device, to the internal power line, and
   wherein a DC-component-blocking capacitor is inserted
     in the internal power line between a point of addition by
     the mixing resistor and the electrode,
   the discharge lamp further comprising a bypassing resistor connected in series with the mixing resistor in such
     a manner as to form a circuit parallel with the capacitor.

5. The discharge lamp according to claim 1, wherein the superimposition circuit is constructed to amplitude-modulate an AC voltage of the internal power line in accordance with the information generated by the information generation device.

6. The discharge lamp according to claim 1, wherein two bases are disposed in the discharge tube, and the information generation device and the superimposition circuit are provided in association with each of the two bases.

7. The discharge lamp according to claim 1, wherein the information generation device includes a sensor that detects environment within or around the base, and the information is information based on an output of the sensor.

8. The discharge lamp according to claim 1, wherein the information generation device outputs the information at a time point when content of the information to be generated has been updated, and the superimposition circuit superimposes the information, output from the information generation device, on the internal power line.

9. The discharge lamp according to claim 1, wherein the information generation device outputs the information at a predetermined timing following a start of lighting of the discharge lamp, and the superimposition circuit superimposes the information, output from the information generation device, on the internal power line.

10. The discharge lamp according to claim 1, wherein the information generation device outputs the information when an information transmission request has been received by the discharge lamp, and the superimposition circuit superimposes the information, output from the information generation device, on the internal power line.

11. The discharge lamp according to claim 1, wherein the information generation device outputs the information in response to detection of instant power-off of the external power line, and the superimposition circuit superimposes the information, output from the information generation device, on the internal power line.

12. The discharge lamp according to claim 1, wherein the discharge lamp is an ultraviolet lamp.

13. A discharge lamp apparatus comprising:
    the discharge lamp according to claim 1; and
    a receiving circuit that extracts and receives the information, superimposed on the internal power line of the discharge lamp, from the external power line connected to the internal power line.

14. The discharge lamp apparatus according to claim 13, further comprising a monitor device that presents the information received by the receiving circuit.

\* \* \* \* \*